United States Patent
Hager et al.

(10) Patent No.: US 9,357,876 B2
(45) Date of Patent: Jun. 7, 2016

(54) SMALL BATCH CANNING SYSTEM

(75) Inventors: Scott Hager, McCordsville, IN (US); Eileen Tarbutton, Fishers, IN (US)

(73) Assignee: Hearthmark, LLC, Fishers, IN (US)

( * ) Notice: Subject to any disclaimer, the term of this patent is extended or adjusted under 35 U.S.C. 154(b) by 1110 days.

(21) Appl. No.: 13/394,516

(22) PCT Filed: Sep. 24, 2010

(86) PCT No.: PCT/US2010/050251
§ 371 (c)(1),
(2), (4) Date: Mar. 6, 2012

(87) PCT Pub. No.: WO2011/038262
PCT Pub. Date: Mar. 31, 2011

(65) Prior Publication Data
US 2012/0168341 A1 Jul. 5, 2012

Related U.S. Application Data (60) Provisional application No. 61/301,908, filed on Feb. 5, 2010, provisional application No. 61/245,821, filed on Sep. 25, 2009.

(51) Int. Cl.
*B65D 85/00* (2006.01)
*A47J 36/18* (2006.01)
*A47J 36/20* (2006.01)

(52) U.S. Cl.
CPC *A47J 36/18* (2013.01); *A47J 36/20* (2013.01); *Y10T 29/49826* (2015.01)

(58) Field of Classification Search
CPC ... B65D 2571/0066; A23L 3/10; A47J 36/18; A47J 36/20
USPC ......... 206/428, 162, 197, 198, 201, 561, 564, 206/203, 526; 99/410, 413, 414; 426/108, 426/119, 120, 131, 397, 401, 107; 294/152, 294/154, 155, 156, 157, 170; 220/511, 486, 220/509, 513; 40/410, 413, 414
See application file for complete search history.

(56) References Cited

U.S. PATENT DOCUMENTS

| | | | | | |
|---|---|---|---|---|---|
| 313,129 | A | * | 3/1885 | Tipney | B65D 7/20 220/486 |
| 374,909 | A | * | 12/1887 | Hopper | G07F 17/0078 126/284 |
| 576,226 | A | * | 2/1897 | Raney | A47J 37/1295 126/391.1 |
| 814,250 | A | * | 3/1906 | Toler | A47J 27/04 99/415 |
| 870,415 | A | * | 11/1907 | Chance | A23L 3/10 126/146 |
| 1,133,430 | A | * | 3/1915 | Cochran | A23L 3/10 99/359 |
| 1,192,088 | A | * | 7/1916 | Meeker | A23L 3/10 99/359 |
| 1,241,002 | A | * | 9/1917 | Neuens | A47J 27/04 99/413 |
| 1,379,000 | A | * | 5/1921 | Dickie | A23L 3/10 211/74 |
| 1,530,175 | A | * | 3/1925 | Hatch, Jr. | A47J 47/16 220/486 |
| 3,859,505 | A | * | 1/1975 | Herbrand | A47J 27/04 219/386 |
| 5,105,948 | A | * | 4/1992 | Morris | B65D 71/70 206/427 |
| 5,115,937 | A | * | 5/1992 | Chausse | B65D 21/0233 206/144 |

* cited by examiner

*Primary Examiner* — Jacob K Ackun
*Assistant Examiner* — Jenine Pagan
(74) *Attorney, Agent, or Firm* — Lawrence J. Shurupoff; Christina DeAngelis (57) ABSTRACT

A small batch canning system, comprising of a jar holder sized to receive and hold a plurality of canning jars and a lifting device having a pair of handles and an engagement surface integral with the pair of handles. The lifting device is vertically moveable about the jar holder from a lower position spaced apart from the jar holder to a raised position engaged with the jar holder.

6 Claims, 9 Drawing Sheets

SMALL BATCH CANNING SYSTEM

FIELD OF THE DISCLOSURE

The present disclosure addresses an economical small batch food canning system providing a low cost alternative to conventional wire racking devices, plastic harnesses, jar lifting devices, plastic colanders, and jar suspension devices.

BACKGROUND

Prior attempts to provide small batch canning systems involved the use of wire racking devices, plastic harnesses, jar lifting devices, plastic colanders, jar suspension devices and others that could not safely and/or reliably solve consumers' small batch canning problems.

Traditionally, metal/wire racks have been used to separate glass canning jars from the bottom of a stock pot in which the jars are heated and also to pull the hot jars from the hot water within the stock pot. This can present safety issues which are avoided by the use of a three-piece canning system having a plastic handle strap as described below.

SUMMARY

A small batch canning kit is designed to make food preservation easy for first time home canners. Everything required for a first time canning operation is provided in a kit including three pint jars with closure lids and bands, one polypropylene colander base, one polypropylene handle ring and one polypropylene strap. The kit is sized to fit within standard stock pots. The relatively small size of the kit is especially desirable since it provides a low cost alternative to purchasing more expansive large water bath canning pots to process a desired recipe in a small batch.

To fit within standard stock pot height requirements, a small batch handle formed on a lifting ring is designed to move and slide vertically and horizontally relative to the jar-holding colander to create additional head room between the top of the handle and the bottom or underside of a stock pot lid. The lifting ring and its integral handles can be selectively fully concentrically engaged with a jar holder such as a colander in a raised lifting position and lowered down, disengaged from the colander such as when the colander is positioned in the bottom of a boiling vessel such as a stock pot.

A flexible strap which ties both sides of the handle tops together can slide in and out of a horizontally-slotted end of one handle of the handle ring thereby allowing further height adjustability to fit fully within a stock pot without interference with a lid placed over the stock pot. The kit is made from polypropylene materials capable of withstanding the high heat conditions seen when processing foods in boiling or superheated water for extended periods of time.

The small batch kit can be provided for less than 10% of the combined cost of purchasing all other components needed for larger batch sizes. This includes enamel-on-steel or stainless steel canners, wire racks, utensil kits and packages of jars with closures. For canners who do not want to spend a lot of money on a venture they are unsure they'll like, the small batch kit is an easy and inexpensive solution and alternative to larger canning systems.

Canners are instructed not to place glass jars on the bottom of the pot while processing. This is due to the risk of thermal shock, fracture and inconsistent thermal processing conditions.

BRIEF DESCRIPTION OF THE DRAWINGS

In the drawings.

In the various views of the drawings, like reference numerals designate like or similar parts.

DETAILED DESCRIPTION OF A REPRESENTATIVE EMBODIMENT

Figure 1:
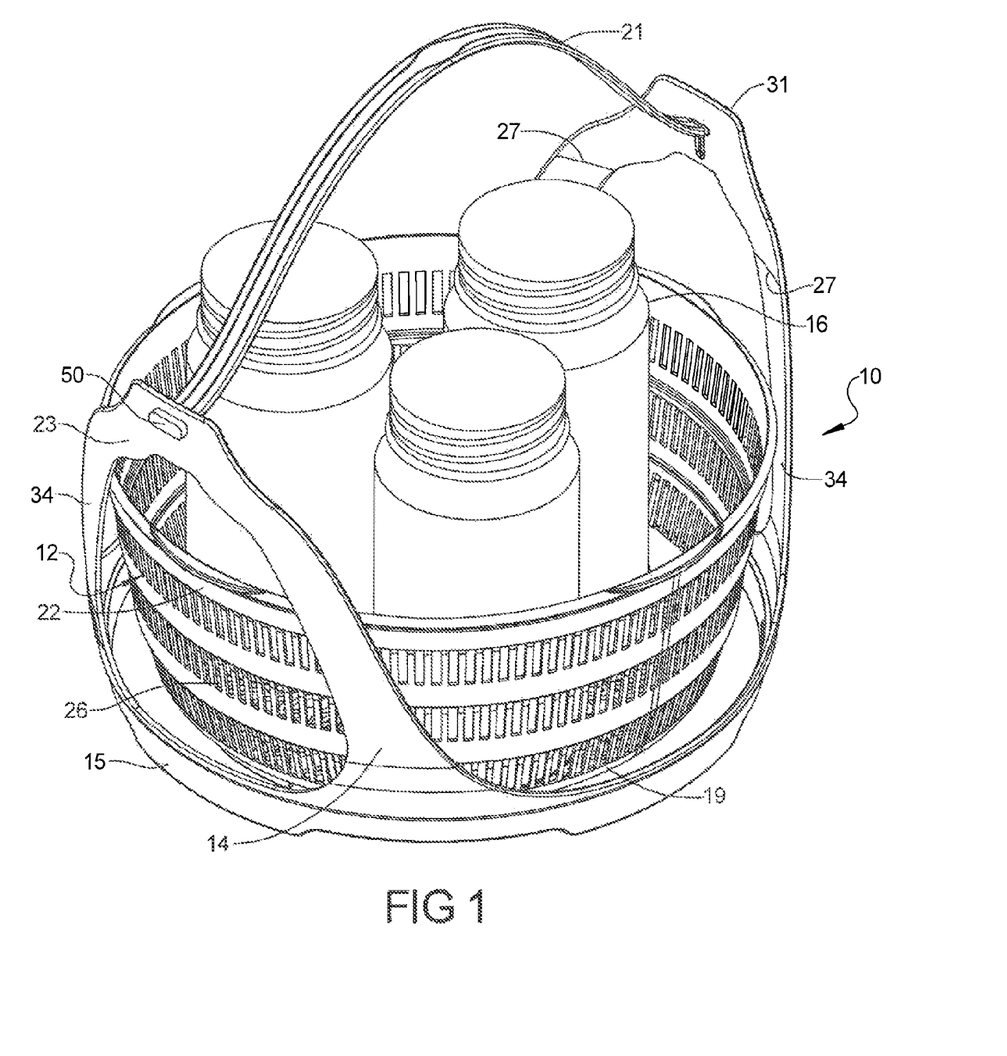
FIG. 1 is a perspective view of a small batch canning system arranged in accordance with this disclosure.
Figure 5:
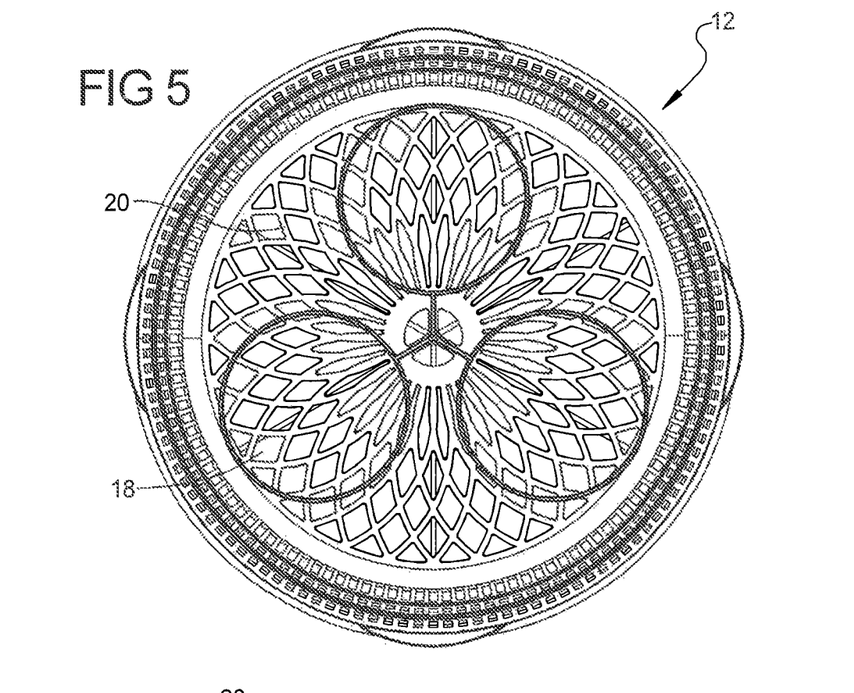
FIG. 5 is a top plan view of the colander of FIG. 1.

FIG. 1 shows one embodiment of the disclosure wherein a small batch canning system 10 includes a perforated or open-walled jar holder such as a basket, base container or colander 12 encircled by a separate removable lifting device such as handle ring 14. A plurality of representative canning jars 16 is shown securely placed within the container 12. Canning jar positioning and holding structures such as a plurality of circular recesses 18 (FIG. 5) are formed in the floor 20 of the container 12 to symmetrically position and hold the jars 16 securely in place.

Figure 2:
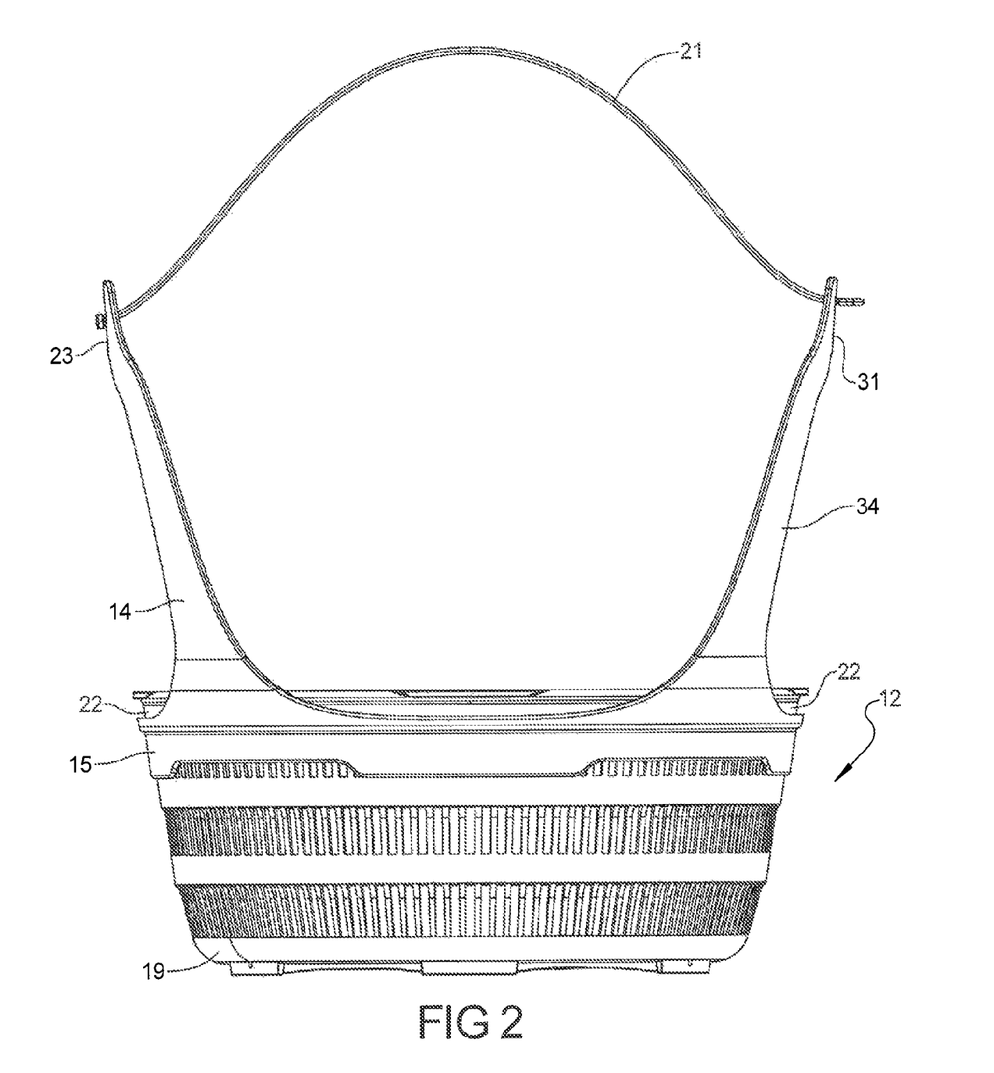
FIG. 2 is a side view of the system of FIG. 1 with the jars removed for clarity and showing the handle ring in a raised position and engaged with a jar holder, container or colander.
Figure 6:
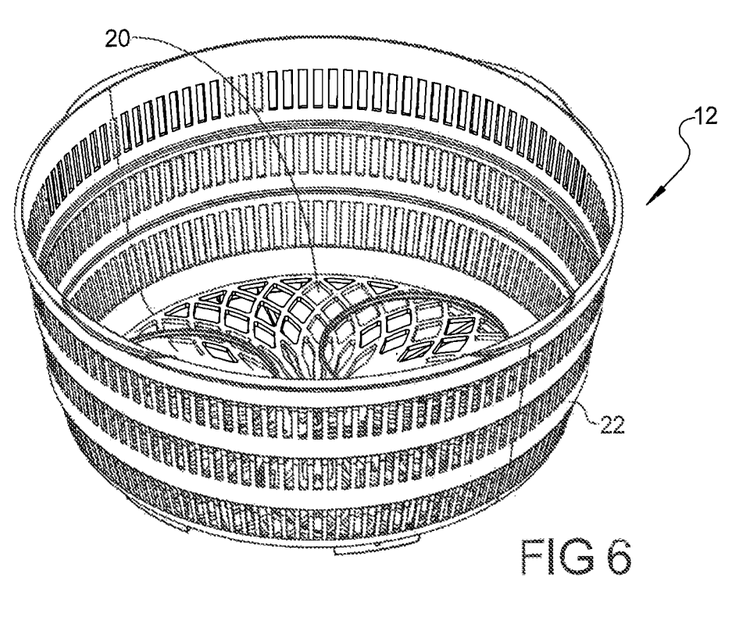
FIG. 6 is a top perspective view of FIG. 5.
Figure 7:
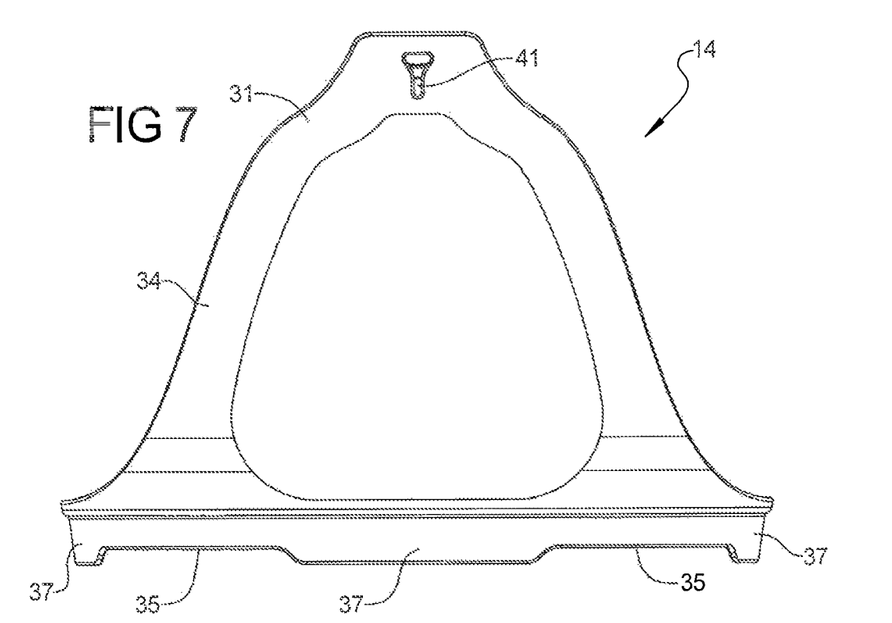
FIG. 7 is a side, view of the handle ring of FIG. 1.
Figure 8:
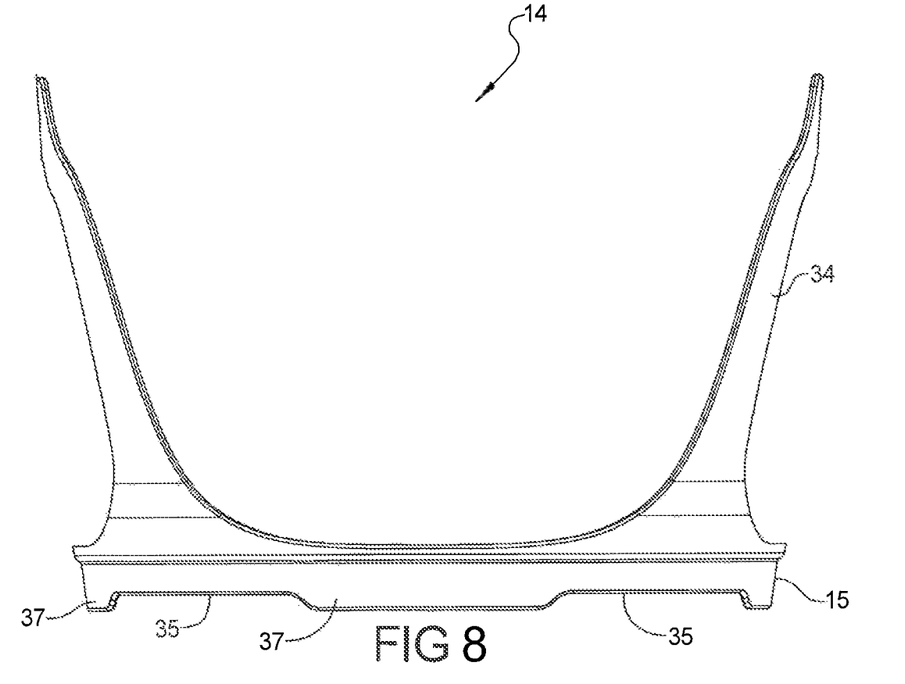
FIG. 8 is a view of FIG. 7 rotated 90 degrees.
Figure 9:
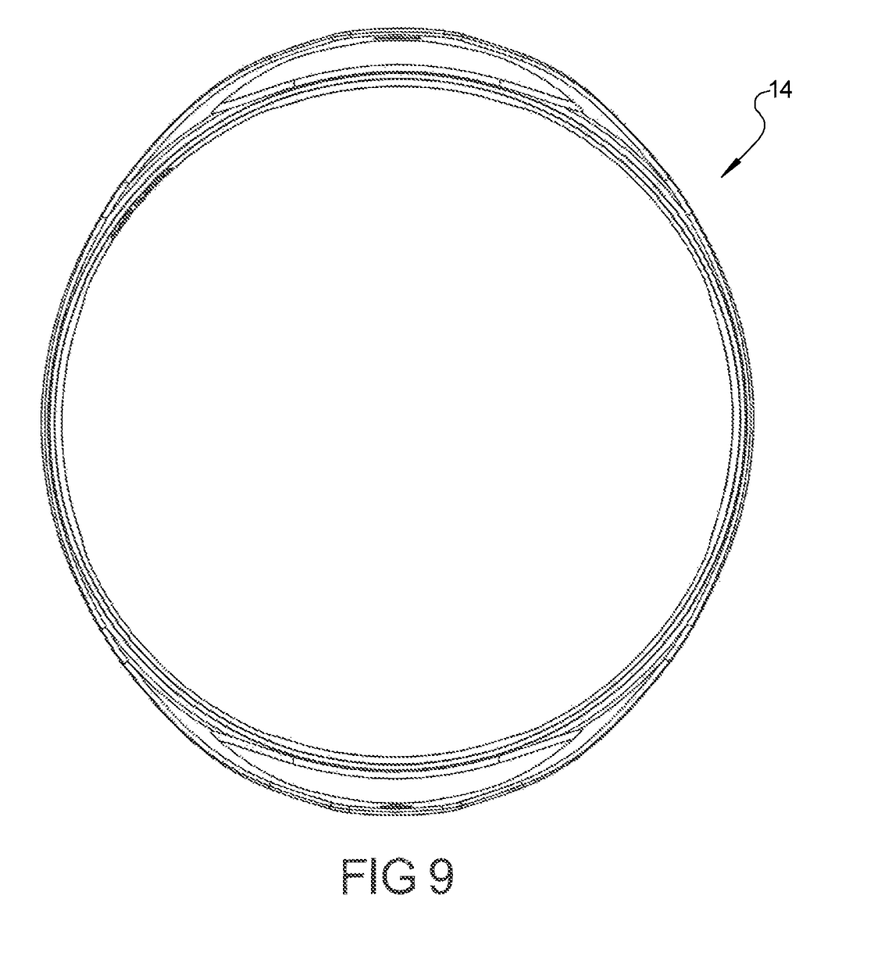
FIG. 9 is a top plan view of FIG. 7.
Figure 10:
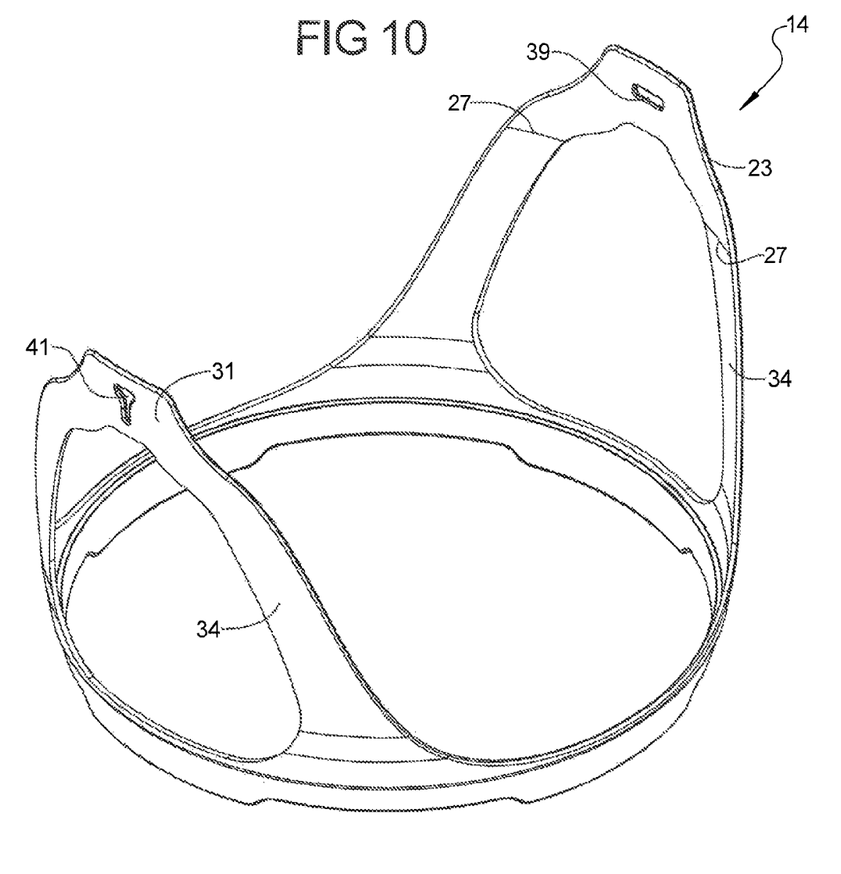
FIG. 10 is a perspective view of FIG. 7.

A lifting ring 15 has a circular or tubular inner wall serving as an engagement surface for selectively engaging the container 12. The floor 20 and sidewall 26 (FIG. 6) of the container 12 can be formed with any suitable pattern of perforations for the passage of water therethrough. In one embodiment, the container or colander 12 has a circular bottom portion 19 (FIG. 2) having an outer diameter less than the inner diameter of the lifting ring 15 and a circular top portion 22 having a diameter greater than the inner diameter of the lifting ring 15. This dimensioning allows for selective engagement and disengagement of the lifting ring 15 with the colander or jar holder 12 by simply vertically lifting and lowering the lifting ring 15 about the jar holder or colander 12. Lifting the lifting ring 15 engages the lifting ring with the top portion 22 of the colander and lowering the lifting ring disengages the lifting ring from the top portion 22 of the colander.

Figure 3:
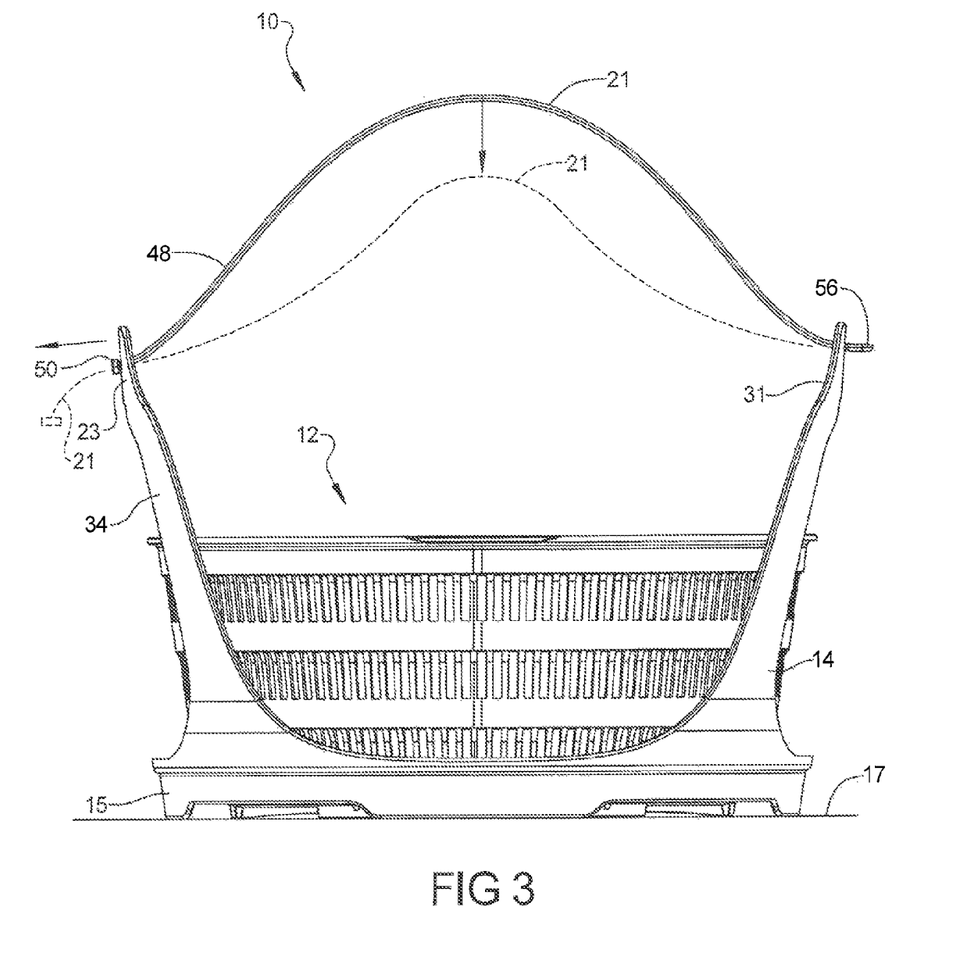
FIG. 3 is a side view of FIG. 1 illustrating the movement of a sliding handle strap.
Figure 4:
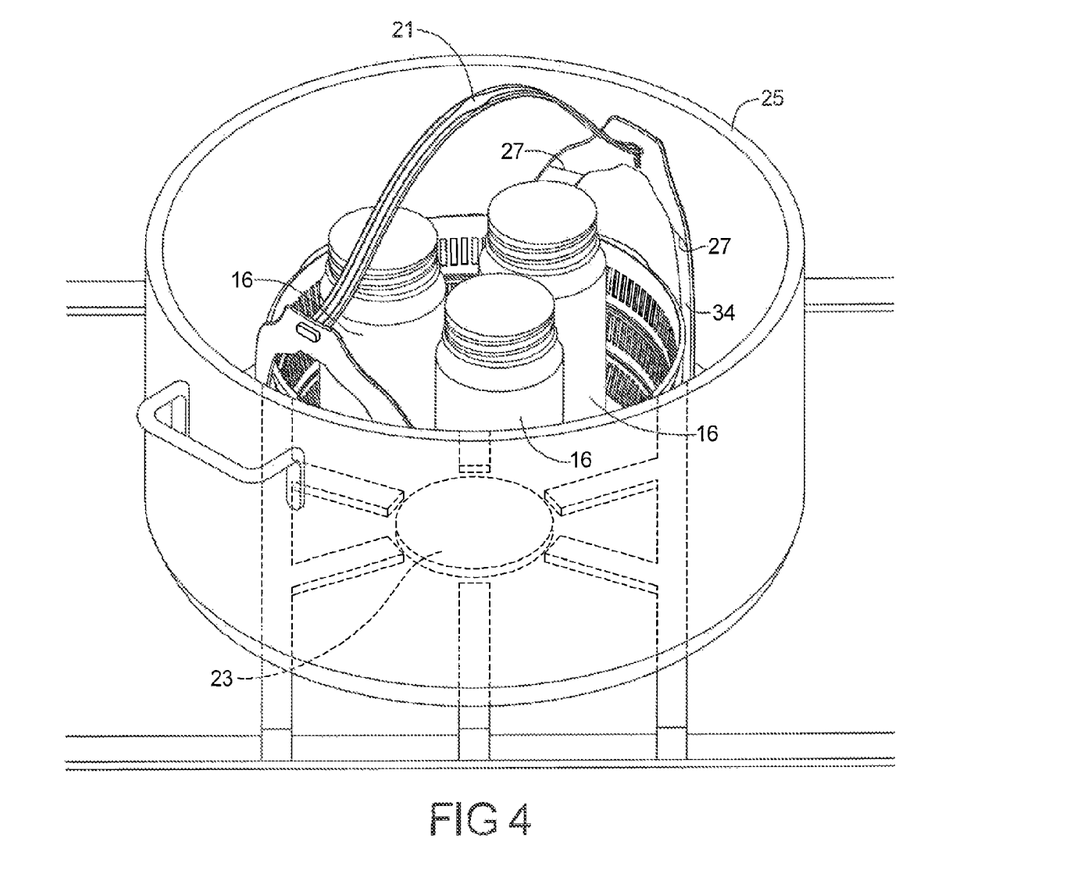
FIG. 4 is a top perspective view of the system of FIG. 1 arranged within a stock pot positioned on a stove.

FIG. 3 illustrates how the kit 10 is assembled on a countertop 17. The jar holder or colander 12 is initially positioned vertically between a flexible strap 21 and the lifting ring 15 as further seen in FIG. 1. In use, a canner submerges the entire kit 10 in a pot of water and brings the water to a boil for a set time, determined by a desired recipe. This can be seen in FIG. 4 where the kit 10 is positioned on a heat source such as a stove burner 23.

To lift the jars 16 within the jar holder, container or colander 12 from a countertop, a canner will first pull slowly up on the flexible strap 21 until an engagement is made between the outer wall 22 of the colander 12 and the inner wall of the lifting ring 15 on the handle ring 14. Once the engagement is secure, the colander 12 and jars 16 can be manually lifted and slowly lowered into a water-filled stock pot 25 (FIG. 4), ensuring at least one inch of water is covering the top of the jars 16. A water level reference point 27 (FIG. 1) on the top portion of the looped or arch-shaped open handles 34 ensures a canner knows how much water is needed to submerge the jars 16 within the stock pot 25. This water level is measured when the handle ring is resting on the floor of the stock pot and is calibrated for use with standard size conventional canning jars.

Once the colander 12 is submerged, the handles 34 can be pushed down to rest on the bottom of the stock pot 25, making extra room to fit a lid on the stock pot 25 without interference with the handles 34. As seen in FIG. 3, the strap 21 can also be lowered or pushed down from the position shown in solid lines to the position shown in dashed lines to provide further clearance between the strap 21 and the lid of a stock pot. Once the processing time requirements of a canning recipe are satisfied, the small batch kit 10 is removed from the stock pot 25 by pulling up on the flexible strap 21 (FIG. 3), which in this embodiment is fixed at one end to one handle 34 and slidable at its other end through a slot formed on the other handle 34.

Structural details of the handle ring are shown in FIGS. 7-11. The handle ring 14 is formed at its bottom edge with one or more openings or cut-outs 35 to facilitate the flow of boiling water when the kit 10 is placed in a stock pot. Coplanar feet or stand-offs 37 support the handle ring 14 on a countertop and in a stock pot.

Figure 11:
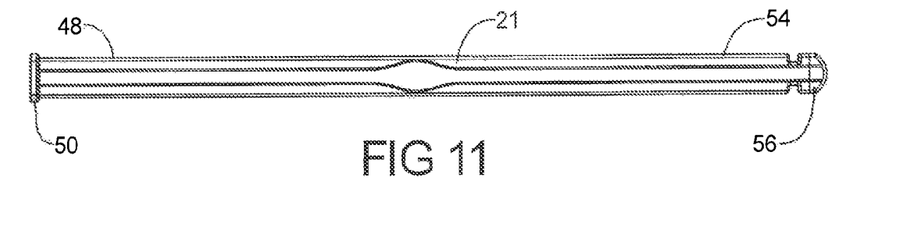
FIG. 11 is a top plan view of a flexible lifting strap.
Figure 12:
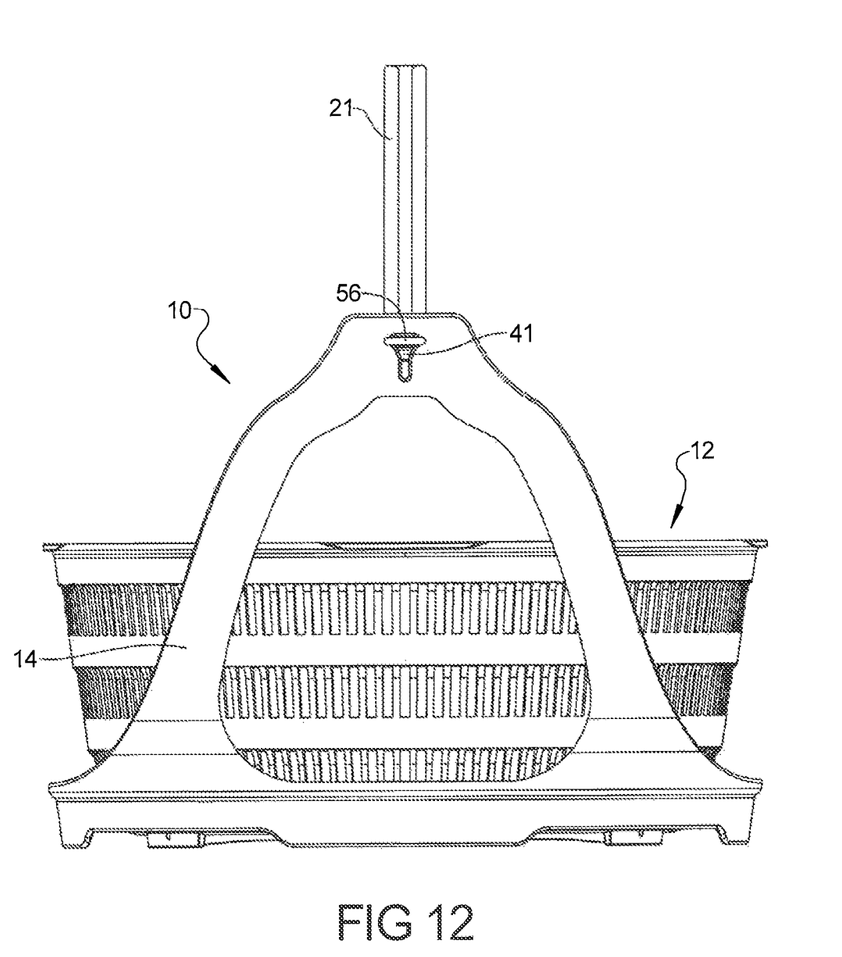
FIG. 12 is a view of FIG. 3 rotated 90 degrees.

Details of the strap 21 are shown in FIGS. 11 and 12. One end 48 of the flexible plastic strap 21 is formed with a nib 50 which prevents the strap 21 from passing inwardly completely through a horizontal slot 39 (FIG. 10) in the handle 34 but allows the strap 21 to freely slide outwardly through the handle (FIG. 3). The other end 54 of the strap 21 has a slotted end tab 56 which is first inserted freely through the horizontal slot 39 in one handle end 23 and then twisted 90 and inserted through the vertical portion of a T-shaped slot 41 in the opposite handle end 31.

Once the slotted end 56 passes through the vertical portion of the T-shaped slot 41, it is turned 90° to lock the strap 21, to handle 34 in the horizontal position shown in FIG. 12. The handle strap 21 provides greater distance and separation between a canner's hand and the hot water and steam in the stock pot 25 than do the handles 34. This increases user safety and comfort without interference of the handles and strap with stock pot lids. Of course, both ends of strap handle 21 can be designed with nibs 50 so that both ends of the strap can slide through the handles 34. By allowing the strap 21 to flex and slide upwardly and downwardly, a user can push strap 21 down into a stock pot for vertical clearance with a stock pot lid and to pull the strap upwardly to provide greater separation between the hot water in the stock pot and a user's hands.

It will be appreciated by those skilled in the art that the above small batch canning system is merely representative of the many possible embodiments of the invention and that the scope of the invention should not be limited thereto, but instead should only be limited according to the following claims.

What is claimed is:

1. A jar holder for a small batch canning system, comprising:
    an open-walled container comprising a floor having canning jar positioning and holding structures for holding canning jars securely in place within said jar holder, wherein said floor is formed with perforations for the passage of water and wherein said positioning and holding structures comprise circular positioning and holding structures for receiving canning jars;
    a circular top portion having an outer diameter and a circular bottom portion having an outer diameter, wherein said outer diameter of said circular top portion is greater than the outer diameter of said circular bottom portion;
    a lifting ring removable from said jar holder wherein said lifting ring comprises an engagement surface spaced apart from said circular bottom portion and selectively engageable with said circular top portion; and
    whereby said lifting ring moves vertically upwardly from a first collapsed position spaced apart from said circular bottom portion to a second position engaged with said circular top portion.

2. The jar holder of claim 1, wherein said circular positioning and holding structures comprise three symmetrically spaced circular positioning and holding structures.

3. The jar holder of claim 2, wherein said floor comprises a circular floor.

4. The jar holder of claim 3, further comprising three canning jars secured in position on said floor by said jar positioning and holding structures.

5. The jar holder of claim 1, wherein said lifting ring includes handles.

6. The jar holder of claim 5, wherein said handles are attached by a removable strap.

\* \* \* \* \*